United States Patent
Dolan et al.

(10) Patent No.: US 10,212,157 B2
(45) Date of Patent: Feb. 19, 2019

(54) FACILITATING DIGITAL DATA TRANSFERS USING AUGMENTED REALITY DISPLAY DEVICES

(71) Applicant: BANK OF AMERICA CORPORATION, Charlotte, NC (US)

(72) Inventors: Heather Dolan, Sarasota, FL (US); Manu J. Kurian, Dallas, TX (US); Graham M. Wyllie, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 269 days.

(21) Appl. No.: 15/353,005

(22) Filed: Nov. 16, 2016

(65) Prior Publication Data

US 2018/0139203 A1    May 17, 2018

(51) Int. Cl.
*H04L 29/06*    (2006.01)
*G06F 21/32*    (2013.01)
(Continued)

(52) U.S. Cl.
CPC ........ *H04L 63/0861* (2013.01); *G02B 27/017* (2013.01); *G06F 3/017* (2013.01);
(Continued)

(58) Field of Classification Search
None
See application file for complete search history.

(56) References Cited

U.S. PATENT DOCUMENTS 5,999,944 A    12/1999    Lipkin
6,408,257 B1    6/2002    Harrington et al.
(Continued)

FOREIGN PATENT DOCUMENTS

CN    103635920 A    3/2014

OTHER PUBLICATIONS

Saettler, M., "Westpac integrates augmented reality into bank account management," http://www.mobilecommercedaily.com/westpac-integrates-augmented-reality-into-bank-account-management, Aug. 6, 2014, 8 pages.
(Continued)

*Primary Examiner* — Henry Tsang
(74) *Attorney, Agent, or Firm* — Michael A. Springs

(57) ABSTRACT

An augmented reality system that includes an augmented reality user device for a first person including a head-mounted display configured to overlay virtual objects onto tangible objects in real-time, a memory, a camera, and one or more processors. The augmented reality user device is configured to perform facial recognition on the captured image to identify a face of the second person, to identify an entry for the second person, and to initiate a peer-to-peer transfer when the entry for the second person has been identified. The augmented reality user device is further configured to authenticate the identify of the second person, to generate a transfer token for facilitating the peer-to-peer transfer, and to send the transfer token to a first institution associated with the first person to initiate the peer-to-peer transfer. A network device of the first institution is configured to receive the transfer token and facilitate the peer-to-peer transfer.

20 Claims, 5 Drawing Sheets

(51) Int. Cl.

| | | |
|---|---|---|
| *H04L 29/08* | (2006.01) | |
| *G06T 19/00* | (2011.01) | |
| *G06K 9/00* | (2006.01) | |
| *G06F 3/16* | (2006.01) | |
| *G06F 3/01* | (2006.01) | |
| *G02B 27/01* | (2006.01) | |

(52) U.S. Cl.
CPC ............. *G06F 3/167* (2013.01); *G06F 21/32* (2013.01); *G06K 9/00288* (2013.01); *G06T 19/006* (2013.01); *H04L 67/1074* (2013.01); *G02B 2027/014* (2013.01); *G02B 2027/0138* (2013.01)

(56) References Cited

U.S. PATENT DOCUMENTS

| | | |
|---|---|---|
| 6,602,075 B2 | 8/2003 | Adams |
| 6,602,076 B2 | 8/2003 | Adams |
| 6,625,299 B1 | 9/2003 | Meisner et al. |
| 6,871,140 B1 | 3/2005 | Florance et al. |
| 6,941,001 B1 | 9/2005 | Bolle et al. |
| 7,099,850 B1 | 8/2006 | Mann, II et al. |
| 7,392,208 B2 | 6/2008 | Morse et al. |
| 7,680,694 B2 | 3/2010 | Glazer et al. |
| 7,817,104 B2 | 10/2010 | Ryu et al. |
| 7,831,471 B2 | 11/2010 | Adams |
| 7,834,883 B2 | 11/2010 | Adams |
| 8,069,095 B2 | 11/2011 | Glazer et al. |
| 8,165,924 B2 | 4/2012 | Smyers et al. |
| 8,285,638 B2 | 10/2012 | Jung et al. |
| 8,326,704 B2 | 12/2012 | Glazer et al. |
| 8,396,738 B1 | 3/2013 | Allan et al. |
| 8,417,625 B2 | 4/2013 | Bannerjee et al. |
| 8,433,650 B1 | 4/2013 | Thomas |
| 8,438,001 B2 | 5/2013 | Natarajan et al. |
| 8,438,110 B2 | 5/2013 | Calman et al. |
| 8,442,295 B2 | 5/2013 | Sam |
| 8,442,906 B1 | 5/2013 | Thomas |
| 8,451,266 B2 | 5/2013 | Hertenstein |
| 8,577,803 B2 | 11/2013 | Chatterjee et al. |
| 8,589,255 B2 | 11/2013 | Glazer et al. |
| 8,601,386 B2 | 12/2013 | Altberg et al. |
| 8,611,601 B2 | 12/2013 | Calman et al. |
| 8,612,363 B2 | 12/2013 | Karkanias et al. |
| 8,635,104 B2 | 1/2014 | Adams |
| 8,660,951 B2 | 2/2014 | Calman et al. |
| 8,688,594 B2 | 4/2014 | Thomas et al. |
| 8,718,612 B2 | 5/2014 | Calman et al. |
| 8,743,145 B1 | 6/2014 | Price |
| 8,803,916 B1 | 8/2014 | Paczkowski et al. |
| 8,805,739 B2 | 8/2014 | Brown et al. |
| 8,810,599 B1 | 8/2014 | Tseng |
| 8,890,896 B1 | 11/2014 | Tseng |
| 8,929,591 B2 | 1/2015 | Calman et al. |
| 8,990,914 B2 | 3/2015 | Da Cruz Pinto et al. |
| 9,007,473 B1 | 4/2015 | Worley, III et al. |
| 9,026,486 B2 | 5/2015 | Doorhy et al. |
| 9,044,673 B1 | 6/2015 | Ahuja et al. |
| 9,047,636 B2 | 6/2015 | Ross |
| 9,066,200 B1 | 6/2015 | Loxam et al. |
| 9,082,149 B2 | 7/2015 | Argue et al. |
| 9,092,600 B2 | 7/2015 | Scavezze et al. |
| 9,092,898 B1 | 7/2015 | Fraccaroli et al. |
| 9,100,493 B1 | 8/2015 | Zhou et al. |
| 9,105,013 B2 | 8/2015 | Chavez |
| 9,111,383 B2 | 8/2015 | Fein et al. |
| 9,153,074 B2 | 10/2015 | Zhou et al. |
| 9,223,950 B2 | 12/2015 | Li et al. |
| 9,230,367 B2 | 1/2016 | Stroila |
| 9,251,504 B2 | 2/2016 | Chavez |
| 9,317,860 B2 | 4/2016 | Calman et al. |
| 9,331,969 B2 | 5/2016 | Barak et al. |
| 9,338,589 B2 | 5/2016 | Loxam et al. |
| 9,342,928 B2 | 5/2016 | Rasane et al. |
| 9,349,118 B2 | 5/2016 | Chavez |
| 9,355,123 B2 | 5/2016 | Wnuk et al. |
| 9,367,878 B2 | 6/2016 | Rao |
| 2002/0044152 A1 | 4/2002 | Abbott, III et al. |
| 2010/0238161 A1 | 9/2010 | Varga et al. |
| 2011/0134108 A1 | 6/2011 | Hertenstein |
| 2012/0156668 A1 | 6/2012 | Zelin |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0310826 A1 | 12/2012 | Chatterjee |
| 2013/0166332 A1 | 6/2013 | Hammad |
| 2013/0226682 A1 | 8/2013 | Grossman |
| 2014/0040127 A1 | 2/2014 | Chatterjee et al. |
| 2014/0067712 A1 | 3/2014 | Prasad et al. |
| 2014/0100994 A1 | 4/2014 | Tatzel et al. |
| 2014/0172559 A1 | 6/2014 | Calman et al. |
| 2014/0181678 A1 | 6/2014 | Louchheim et al. |
| 2014/0279426 A1 | 9/2014 | Holman et al. |
| 2014/0330511 A1 | 11/2014 | Tison et al. |
| 2014/0337175 A1 | 11/2014 | Katzin et al. |
| 2014/0379468 A1 | 12/2014 | Ganesh et al. |
| 2015/0012426 A1 | 1/2015 | Purves et al. |
| 2015/0026072 A1* | 1/2015 | Zhou ................. H04M 1/72522 705/71 |
| 2015/0046284 A1 | 2/2015 | Hart |
| 2015/0058229 A1 | 2/2015 | Wiacek et al. |
| 2015/0066722 A1 | 3/2015 | Calman et al. |
| 2015/0073907 A1 | 3/2015 | Purves et al. |
| 2015/0082203 A1 | 3/2015 | James et al. |
| 2015/0100637 A1* | 4/2015 | Lakshmegowda ........................... H04L 67/1044 709/204 |
| 2015/0154446 A1 | 6/2015 | Masood et al. |
| 2015/0186984 A1 | 7/2015 | Loganathan |
| 2015/0206218 A1 | 7/2015 | Banerjee et al. |
| 2015/0221151 A1 | 8/2015 | Bacco et al. |
| 2015/0229750 A1 | 8/2015 | Zhou et al. |
| 2015/0254510 A1 | 9/2015 | McKinnon et al. |
| 2015/0294322 A1 | 10/2015 | Grigg et al. |
| 2015/0302027 A1 | 10/2015 | Wnuk et al. |
| 2015/0324562 A1 | 11/2015 | Scavezze et al. |
| 2015/0339468 A1 | 11/2015 | Son et al. |
| 2015/0348329 A1 | 12/2015 | Carre et al. |
| 2015/0363761 A1 | 12/2015 | Grigg et al. |
| 2015/0363764 A1 | 12/2015 | Grigg et al. |
| 2016/0049095 A1 | 2/2016 | Yannier et al. |
| 2016/0063484 A1 | 3/2016 | Carpenter et al. |
| 2016/0063517 A1 | 3/2016 | Sorensen |
| 2016/0078449 A1 | 3/2016 | Banerjee |
| 2016/0098936 A1 | 4/2016 | Solomon |
| 2016/0171767 A1 | 6/2016 | Anderson |
| 2016/0188861 A1 | 6/2016 | Todeschini |
| 2016/0189426 A1 | 6/2016 | Thomas et al. |
| 2016/0206960 A1 | 7/2016 | Allen et al. |
| 2016/0210784 A1 | 7/2016 | Ramsby et al. |
| 2016/0210790 A1 | 7/2016 | Rasane et al. |
| 2016/0217623 A1 | 7/2016 | Singh |
| 2016/0316367 A1* | 10/2016 | Rose ..................... H04W 12/06 |

OTHER PUBLICATIONS

Johansen, J. N. et al., "Real World Gamification Using Augmented Reality User Devices ," U.S. Appl. No. 15/377,690, filed Dec. 13, 2016, 70 pages.

Adams, A. J. et al., "Virtual Reality Dynamic Authentication," U.S. Appl. No. 15/367,590, filed Dec. 2, 2016, 58 pages.

Lee, J. et al., "Contextual Augmented Reality Overlays," U.S. Appl. No. 15/363,388, filed Nov. 29, 2016, 50 pages.

Waldron, W. H. et al., "Virtual Assessments Using Augmented Reality User Devices," U.S. Appl. No. 15/364,927, filed Nov. 30, 2016, 85 pages.

Votaw, E. S. et al., "Remote Document Execution and Network Transfer Using Augmented Reality Display Devices," U.S. Appl. No. 15/353,370, filed Nov. 16, 2016, 42 pages.

Dolan, H. et al., "Augmented Reality Headset and Digital Wallet," U.S. Appl. No. 15/363,692, filed Nov. 29, 2016, 41 pages.

(56) References Cited

OTHER PUBLICATIONS

Johansen, J. N., "Facilitating Dynamic Across-Network Location Determination Using Augmented Reality Display Devices," U.S. Appl. No. 15/372,909, filed Dec. 8, 2016, 44 pages.

Ogrinz, M. et al., "Facilitating Network Security Analysis Using Virtual Reality Display Devices." U.S. Appl. No. 15/367,896, filed Dec. 2, 2016, 44 pages.

Dintenfass, K., "Property Assessments Using Augmented Reality User Devices," U.S. Appl. No. 15/367,435, filed Dec. 2, 2016, 81 pages.

Wadley, C. D. et al., "Facilitating Across-Network, Multi-User Sessions Using Augmented Reality Display Devices," U.S. Appl. No. 15/397,086, filed Jan. 3, 2017, 49 pages.

Dintenfass, K., "Geo-targeted Property Analysis Using Augmented Reality User Devices," U.S. Appl. No. 15/367,554, filed Dec. 2, 2016, 80 pages.

Adams, A. J. et al., "Augmented Reality Dynamic Authentication for Electronic Transactions," U.S. Appl. No. 15/367,551, filed Dec. 2, 2016, 57 pages.

Lee, J., "Facilitating Digital Data Transfers Using Virtual Reality Display Devices," U.S. Appl. No. 15/363,185, filed Nov. 29, 2016, 52 pages.

Dintenfass, K., "Real Estate Property Project Analysis Using Augmented Reality User Devices," U.S. Appl. No. 15/367,822, filed Dec. 2, 2016, 81 pages.

Adams, A. J. et al., "Augmented Reality Dynamic Authentication,"U.S. Appl. No. 15/367,502, filed Dec. 2, 2016, 57 pages.

Waldron, W. H. et al., "Virtual Behavior Training Using Augmented Reality User Devices," U.S. Appl. No. 15/377,795, filed Dec. 13, 2016, 71 pages.

Dolan, H. et al., "User Authentication and Authorization for Electronic Transaction," U.S. Appl. No. 15/363,495, filed Nov. 29, 2016, 41 pages.

Waldron, W. H. et al., "Geolocation Notifications Using Augmented Reality User Devices," U.S. Appl. No. 15/365,272, filed Nov. 30, 2016, 85 pages.

Waldron, W. H. et al., "Object Recognition and Analysis Using Augmented Reality User Devices," U.S. Appl. No. 15/365,511, filed Nov. 30, 2016, 86 pages.

Wadley, C. D. et al., "Facilitating Across-Network Handoffs for Devices Using Augmented Reality Display Devices," U.S. Appl. No. 15/397,031, filed Jan. 3, 2017, 49 pages.

Wadley, C. D. et al., "Facilitating Across-Network Handoffs for an Assistant Using Augmented Reality Display Devices," U.S. Appl. No. 15/397,125, filed Jan. 3, 2017, 48 pages.

Johansen, J. N., "Facilitating Dynamic Across-Network Location Determination Using Augmented Reality Display Devices," U.S. Appl. No. 15/372,964, filed Dec. 8, 2016, 43 pages.

\* cited by examiner

FACILITATING DIGITAL DATA TRANSFERS USING AUGMENTED REALITY DISPLAY DEVICES

TECHNICAL FIELD

The present disclosure relates generally to performing operations using an augmented reality display device that overlays graphic objects with objects in a real scene.

BACKGROUND

Securely transferring data and information across a network poses several technical challenges. Networks are susceptible to attacks by unauthorized users trying to gain access to sensitive information being communicated across the network. Unauthorized access to a network may compromise the security of the data and information being communicated across the network. Existing systems may allow a user to authenticate themselves, but are unable to allow the user to authenticate other people. Without the ability to authenticate other people the user may be vulnerable to spoofing and other kinds of fraudulent activities. Thus, it is desirable to provide the ability to securely transfer information and resources among users across a network.

SUMMARY

In one embodiment, the disclosure includes an augmented reality system that includes an augmented reality user device for a user comprising a head-mounted display, a memory, a camera, and one or more processors. The head-mounted display presents and overlays virtual objects onto tangible objects in a real scene in real-time to the user. The memory stores a transfer database with a plurality of entries for pending transactions. Each entry may have a person identifier identifying another person, a face image of the other person linked with the person identifier, account information for the other person, a resource identifier identifying a resource to be transferred, and a verification signal identifying a signal provided by the other person to authenticate themselves. The camera captures images of other people in front of the augmented reality user device user.

The processors implement a facial recognition engine and a digital data transfer engine. The facial recognition engine performs facial recognition on a captured image of another person to identify the face of the other person. The digital data transfer engine compares the face of the other person to images in the transfer database to identify an entry for the other person. The digital data transfer engine receives an initiate transfer command from the first person when the entry for the second person has been identified. The initiate transfer command indicates to initiate a peer-to-peer transfer.

The digital data transfer engine receives an authentication signal identifying the other person. The digital data transfer engine then compares the authentication signal with the verification signal in the entry for the other person to authenticate the identify of the other person. The digital data transfer engine generates a transfer token when the authentication signal is the same as the verification signal. The transfer token is used for facilitating the peer-to-peer transfer between the user and the other person. The transfer token identifies the user, the other person, an account for the other person, and a resource to be transferred. The digital data transfer engine sends the transfer token to a first institution associated with the first person to initiate the peer-to-peer transfer.

The first institution includes a network device with a network transfer engine that receives the transfer token. The network transfer engine identifies the user, an account linked with the user, the other person, and an account linked with the other person based on the transfer token. The network transfer engine also identifies a second institution for the other person based on the account linked with the other person. The network transfer engine determines whether the augmented reality user device user and the other person are members of the same service network based on the identity of the first institution and the identity of the second institution. The network transfer engine performs an out-of-network transfer when the user and the other person are not members of the same service network. The network transfer engine performs an in-network transfer when the first person and the second person are members of the same service network.

The present embodiment presents several technical advantages. In one embodiment, an augmented reality user device employs transfer tokens to allow data transfers to be executed using less information than other existing systems. By using less information to perform data transfers, the augmented reality user device reduces the amount of data that is communicated across the network. Reducing the amount of data that is communicated across the network improves the performance of the network by reducing the amount of time network resource are occupied.

The augmented reality user device generates transfer tokens based on an image of another person which improves the performance of the augmented reality user device by reducing the amount of information required to identify another person, authenticate the other person, and facilitate a data transfer. Additionally, the augmented reality user device purges a database of pending transactions to improve memory utilization.

Transfer tokens also provide another technical advantage by allowing a user to make a data transfer without prior knowledge about another user's network or network services by using transfer tokens. Additionally, transfer tokens are encoded or encrypted to obfuscate and mask information being communicated across a network. Masking the information being communicated protects users and their information in the event of unauthorized access to the network and/or data occurs.

Another technical advantage is the augmented reality user device uses a combination of facial recognition, voice recognition, and/or predetermined signal or code to perform a multistep authentication process to authenticate another person prior to making a data transfer. This feature may be particularly useful if a user is vision impaired. The ability for the augmented reality user device to authenticate both the user and another person provides improved information security by controlling whom has access to sensitive information.

Another technical advantage is an augmented reality user device's ability to store details for a transfer and to delay the transfer until conditions for triggering a transfer are satisfied. The augmented reality user device stores details and triggering conditions to provide the user the ability to delay a transfer, for example, when resources are unavailable, without requiring the user to reenter details about the transfer. Also, the augmented reality user device allows transfers to be made automatically or spontaneously when resources are available without requiring the user to preschedule the transfer without knowledge of whether the resources will be available.

Another technical advantage is an augmented reality user device's ability to automatically identify other people and to retrieve details about any pending transfers. The augmented reality user device allows the user to be alerted in real-time by overlaying virtual or graphical objects indicating a pending transfer onto tangible object in a real scene using an augmented reality display.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
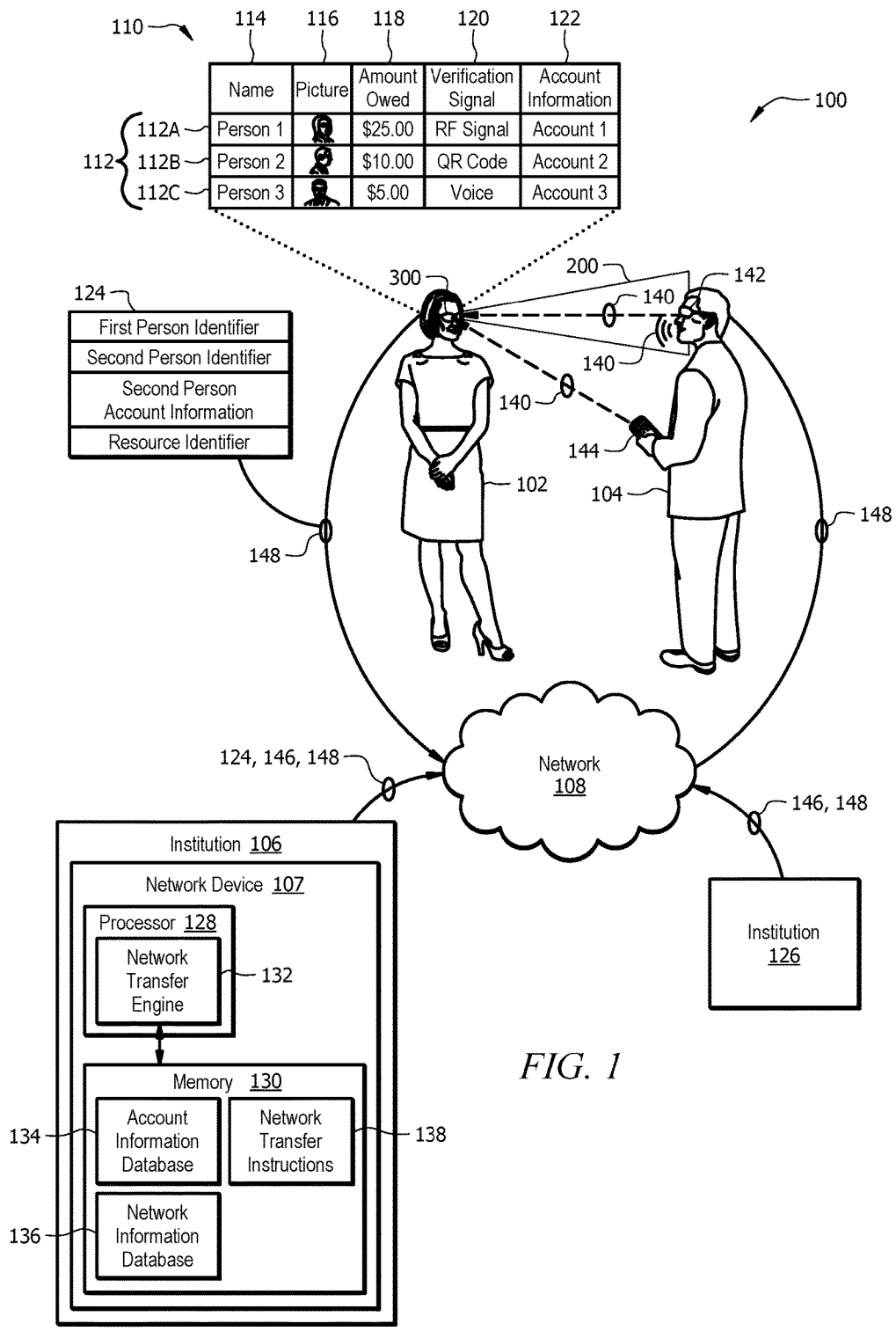
FIG. 1 is a schematic diagram of an embodiment of a augmented reality system configured to facilitate digital data transfers.

Securely transferring data and information across a network poses several technical challenges. Networks are susceptible to attacks by unauthorized users trying to gain access to sensitive information being communicated across the network. Unauthorized access to a network may compromise the security of the data and information being communicated across the network.

One technical solution for improving network security is an augmented reality user device that generates and uses transfer tokens to allow a user to send information that is pertinent to executing a transfer between multiple people. The augmented reality user device allows transfer tokens to be generated automatically upon identifying and authenticating another person. The transfer token may be encoded or encrypted to obfuscate the information being communicated by it. Using transfer tokens to mask information that is communicated across the network may protect users and their information in the event of unauthorized access to the network and/or data occurs. The transfer tokens also allow for data transfers to be executed using less information than other existing systems, and thereby reduces the amount of data that is communicated across the network. Reducing the amount of data that is communicated across the network may improve the performance of the network by reducing the amount of time network resource are occupied.

The augmented reality user device uses facial recognition of another person to quickly retrieve information for generating transfer tokens. The augmented reality user device allows information for generating transfer tokens to be retrieved based on an image of a person which significantly reduces the amount of time required to perform a transfer compared to existing systems that rely on the user to manually enter information all of the information for the transfer. Using facial recognition to identify and retrieve information also allows the augmented reality user device to be less dependent on user input, which may reduce the likelihood of user input errors and improves reliability of the system.

Another technical challenge associated with transferring data and information across a network is the inability to authenticate both parties prior to making a transfer. Existing solutions may allow a user to identify themselves, but do not provide a mechanism that allows the user to identify and authenticate another person. The inability to identify and authenticate another person makes transferring data and information vulnerable to spoofing and other kinds of fraudulent attacks. For example, someone can pose as another person to spoof a user and to request a transfer by the user.

A technical solution to fraudulent activities is the integration of one or more mechanisms that allow a user to identify and authenticate another person using verifiable information. For example, the augmented reality user device uses a combination of facial recognition, voice recognition, and/or predetermined signal or code to perform a multistep authentication process to authenticate another person prior to making a transfer. This feature may be particularly useful if a user is vision impaired. The ability for the user to authenticate another user provides improved information security by controlling who has access to sensitive information.

Existing systems for transferring data and information are limited to performing only immediate transfers or prescheduled transfers. For example, when using an existing system, if a user wants to make a transfer the user has to manually input details for the transfer and then immediately execute the transfer. In some instances, a resource to be transferred may be unavailable and an immediate transfer cannot be performed. In these instances, existing solutions may abort the transfer and require the user to reenter the details for the transfer when the resources are available to be transferred. In other examples, existing systems may allow the user to schedule a transfer by providing details for the transfer and selecting a future time to perform the transfer. Similar to the previous example, the resources to be transferred may be unavailable at the scheduled time and the scheduled transfer cannot be performed. Thus, existing systems limit the user ability to accommodate making transfers when resources to be transferred are unavailable.

One technical solution to these technical problems is to allow the user to store details for a transfer and to delay the transfer until the transfer is triggered by the identification of another person and an authorization is received from the other person. Transfers may be performed automatically using previously stored information when the conditions for triggering a transfer (e.g. an authorization signal from an identified person) are satisfied. Storing details and triggering conditions provides the user the ability to delay a transfer, for example, when resources are unavailable, without requiring the user to reenter details about the transfer. Additionally, transfer can be made automatically or spontaneously when resources are available without requiring the user to pre-schedule the transfer without knowledge of whether the resources will be available.

Another technical challenge associated with transferring data and information across a network is that people may be a part of different institutions that are members of different service networks and/or have access to different types of network services for sharing information and transferring resources with each other. Some service networks may not support certain types of network resources and/or network services which may cause challenges when transferring data and information across different networks. Transfer tokens provide a technical solution by allowing a user to make a transfer without prior knowledge about another user's network or network services by using transfer tokens.

In addition to providing several technical solutions to these technical challenges, an augmented reality user device allows a user to perform on-demand digital data transfer or delayed digital data transfer by automatically identifying other people and retrieving details about any pending transfers. An augmented reality user device allows the user to be alerted in real-time by overlaying virtual or graphical objects indicating pending transfers onto a tangible object in a real scene using an augmented reality display. The augmented reality user device is configured to perform a transformation of data from a captured image of another person to a transfer token that can be used to facilitate a peer-to-peer transfer with the other person. Generating transfer tokens based on an image of another person may improve the performance of the augmented reality user device by reducing the amount of information required to identify another person, authenticate the other person, and facilitate a peer-to-peer transfer. Once a transfer has been completed, the augmented reality user device may purge an entry or a reminder in a transfer database to improve memory utilization.

Figure 2:
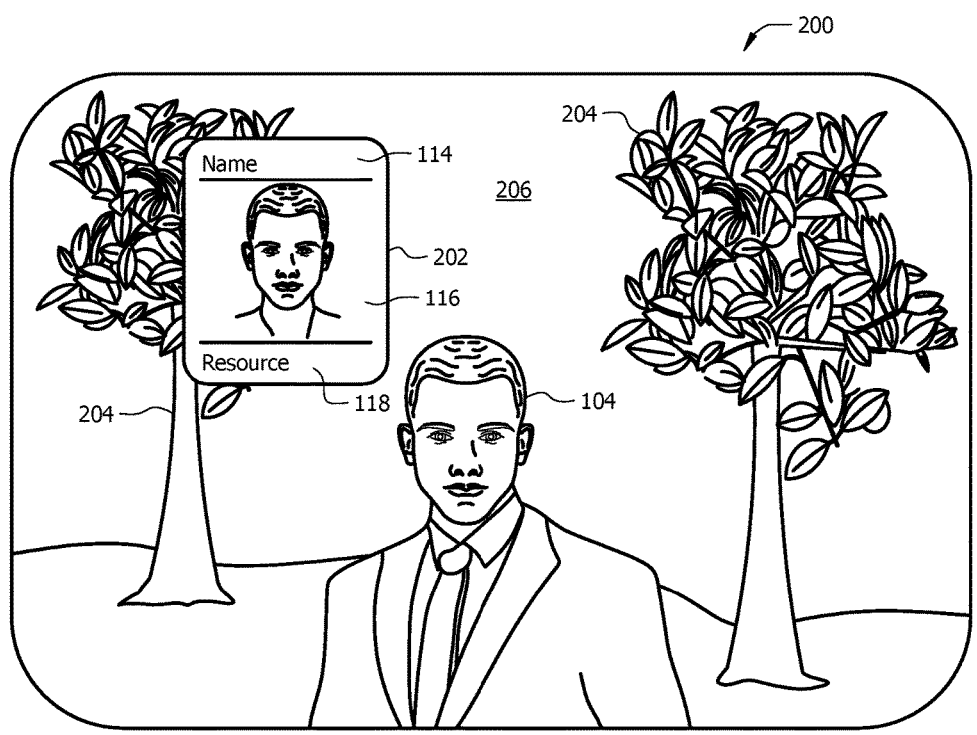
FIG. 2 is a first person view of an embodiment for an augmented reality user device display overlaying virtual objects with a real scene.
Figure 3:
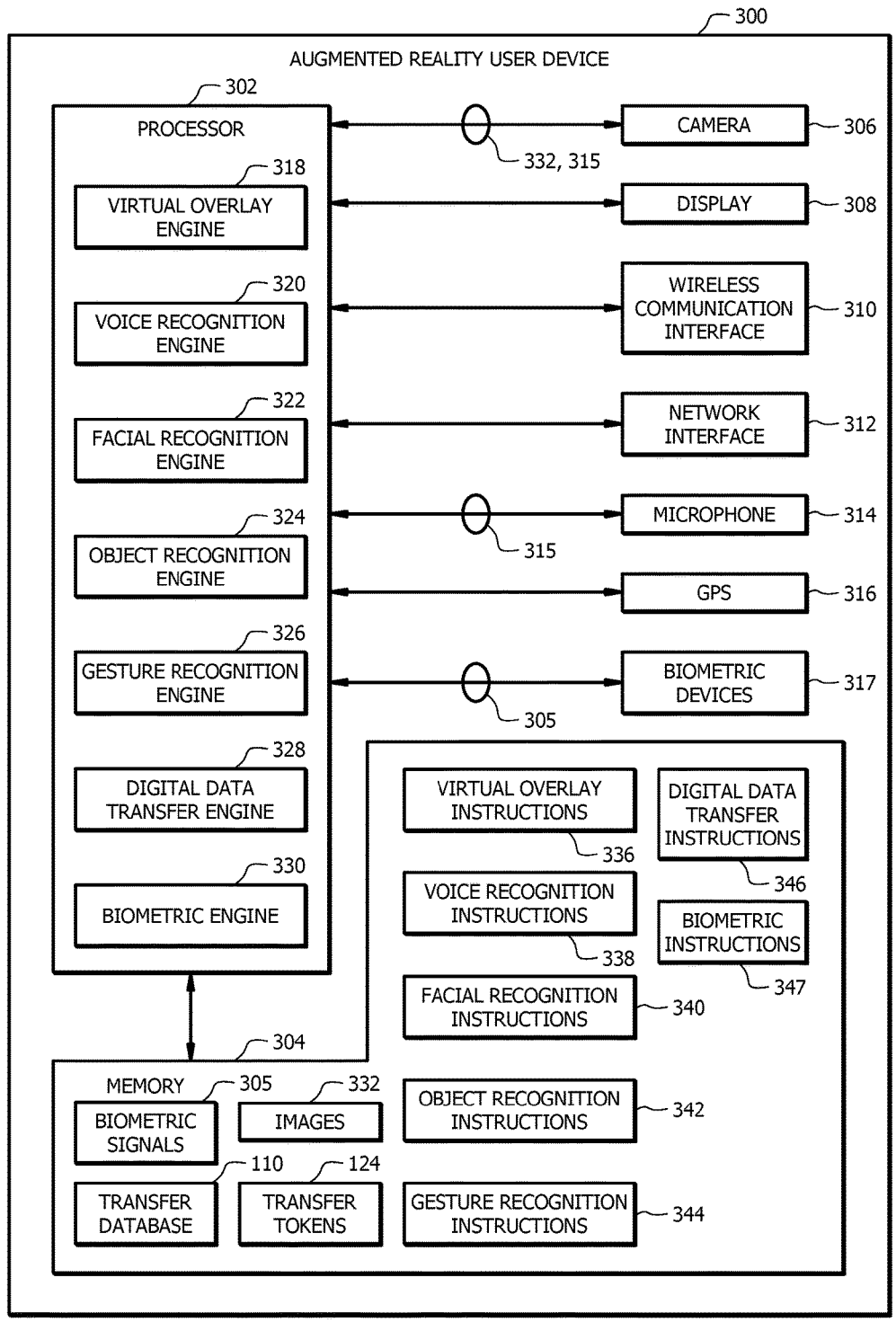
FIG. 3 is a schematic diagram of an embodiment of an augmented reality user device employed by the augmented reality system.
Figure 4:
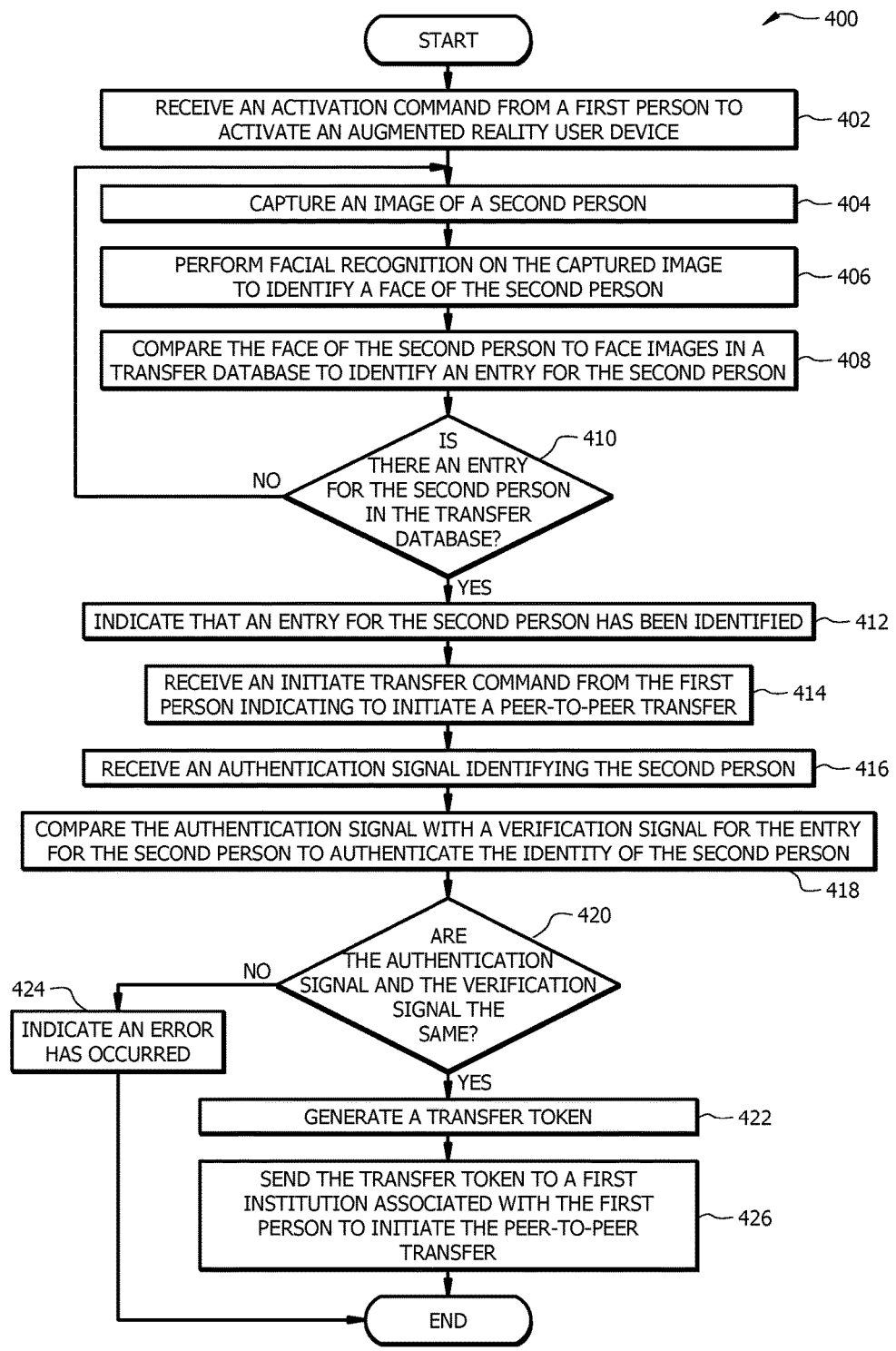
FIG. 4 is a flowchart of an embodiment of an augmented reality digital data transfer method performed by an augmented reality user device.
Figure 5:
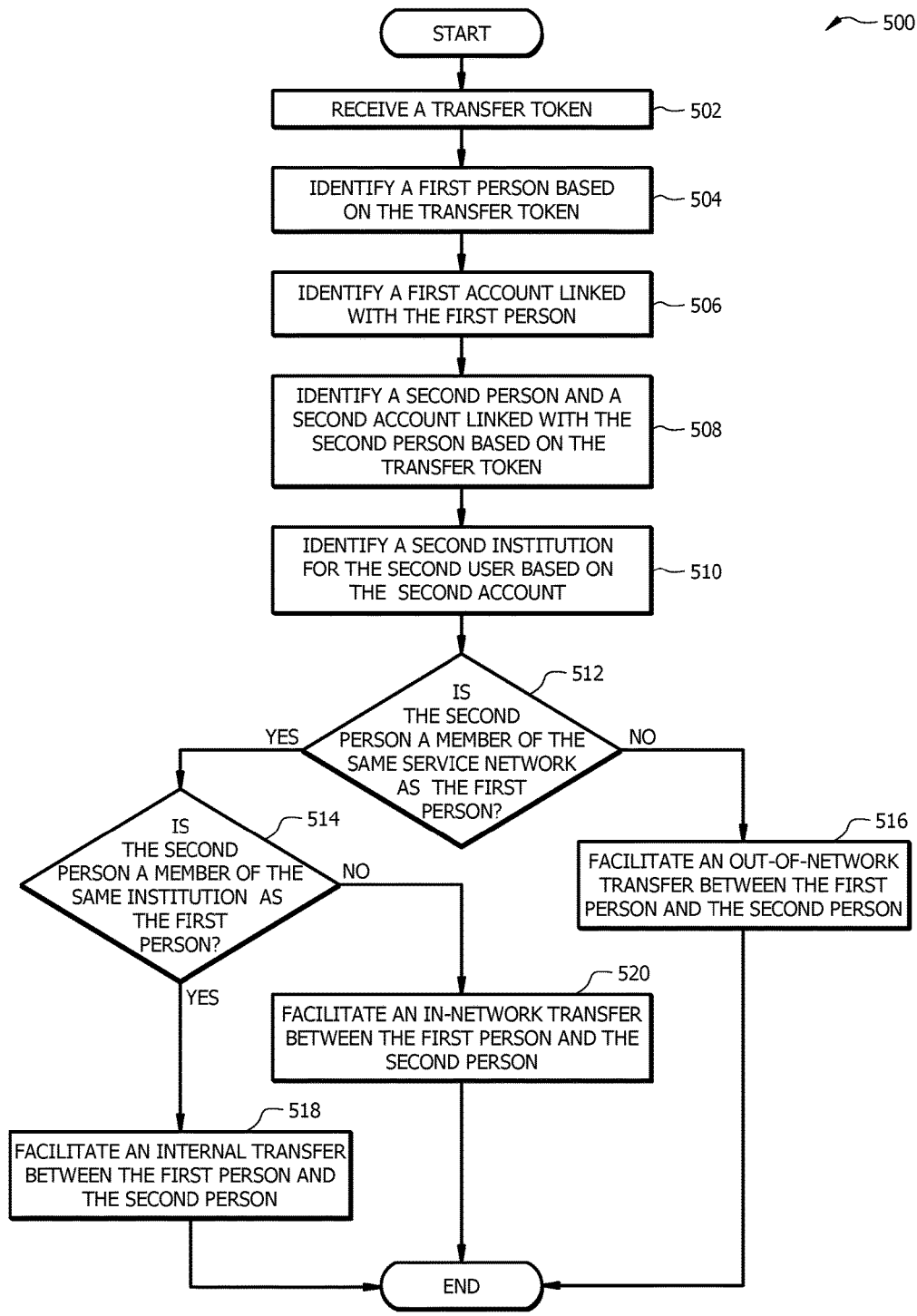
FIG. 5 is a flowchart of an embodiment of an augmented reality digital data transfer method performed by network device.

FIG. 1 illustrates a user employing an augmented reality user device to perform a digital data transfer with another person. FIG. 2 provides a first person view of what a user might see when using the augmented reality user device to perform a digital data transfer. FIG. 3 is an embodiment of a how an augmented reality user device may be configured and implemented. FIGS. 4 and 5 provide examples of how a digital data transfer may be performed using an augmented reality user device and a network device, respectively.

FIG. 1 is a schematic diagram of an embodiment of an augmented reality system 100 configured to facilitate digital data transfers (e.g. peer-to-peer transfers) between a first person 102 and a second person 104. The augmented reality system 100 comprises an augmented reality user device 300 in signal communication with an institution 106 for the first person 102 via a network 108. The augmented reality user device 300 is configured to employ any suitable type of connection to communicate data with the institution 106. In FIG. 1, the augmented reality user device 300 is configured as a head-mounted wearable device. Other examples of wearable devices are integrated into a contact lens structure, an eye glass structure, a visor structure, a helmet structure, or any other suitable structure. In some embodiments, the augmented reality user device 300 may be or may be integrated with a mobile user device. Examples of mobile user devices include, but are not limited to, a mobile phone, a computer, a tablet computer, and a laptop computer. Additional details about the augmented reality user device 300 are described in FIG. 3. The augmented reality user device 300 is configured to capture an image of the second person 104, to determine whether there are any pending transfers with the second person 104, and to generate a transfer token 124 that is used to facilitate a peer-to-peer transfer to transfer a resource between the first person 102 and the second person 104 when there is a pending transfer with the second person 104. Examples of an augmented reality digital data transfer using the augmented reality user device 300 are described in more detail below and in FIG. 4.

The augmented reality user device 300 is configured to employ a transfer database 110 to identify the second person 104 and to determine whether there are any pending transfers with the second person 104. The transfer database 110 comprises a plurality of entries 112 identifying pending transfers. Each entry 112 comprises information including, but not limited to, a person identifier 114, a face image 116, a resource identifier 118, a verification signal 120, account information 122, and/or any other suitable information, or combinations thereof.

A person identifier 114 is a label or descriptor (e.g. a name) used to identify a person. In one embodiment, the person identifier 114 also indicates whether the person is a sender or a receiver of a resource for a pending transfer. A face image 116 is an image of a person that includes at least the person's face suitable for use with facial recognition processes. A resource identifier 118 identify a resource and/or an amount of a resource to be transferred. Examples of transferable resources include, but are not limited to, information, currency, files, messages, and documents. In one embodiment, the resource identifier 118 indicates that a resource is being received by the first person 102 when the resource identifier 118 is a positive value (e.g. a positive currency amount). The resource identifier 118 indicates that a resource is being sent from the first person 102 when the resource identifier 118 is a negative value (e.g. a negative currency amount). In other examples, the resource identifier 118 may use any other suitable technique to indicate whether a resource is being sent from or received by the first person 102.

A verification signal 120 identifies a signal and/or type of signal that will be provided by a person to authenticate themselves. For example, a verification signal 120 is a known code or signal that can be compared to an authentication signal 140 to identify and authenticate another person. Examples of types of verification signals 120, include but are not limited to, radio-frequency (RF) signals, quick response (QR) codes, barcodes, images, gestures (e.g. hand or finger gestures), Bluetooth signals, radio-frequency identification (RFID) signals, near-field communication (NFC) signals, and voice commands.

Account information 122 comprises information about an account for another person. For example, account information 122 may comprise account details (e.g. account number and/or routing number), a token (e.g. a dynamic primary account number (DPAN)), or an alias (e.g. a phone number or email address) that is linked with a person and/or to a person's account. The augmented reality user device 300 is configured to allow the first person 102 to provide inputs and to generate entries 112 for the transfer database 110. For example, the first person 102 captures and stores an image of the second person 104 and provides any other information about a transfer between the first person 102 and the second person 104 to generate an entry 112 in the transfer database 110.

As an example, the transfer database 110 comprises a first entry 112A that comprises a first person identifier 114 identifying a person as a receiver in a peer-to-peer transfer, a face image 116 of the person identified by the first person identifier 114, a resource identifier 118 indicating an amount of twenty five dollars, a verification signal 120 identifying an RF signal that will be provided by the person identified by the first person identifier 114, and account information 122 for the person identified by the first person identifier 114. The transfer database 110 further comprises a second entry 112B that comprises a second person identifier 114 identifying a person as a receiver in a peer-to-peer transfer, a face image 116 of the person identified by the second person identifier 114, a resource identifier 118 indicating an amount of ten dollars, a verification signal 120 identifying a QR code that will be provided by the person identified by the second person identifier 114, and account information 122 for the person identified by the second person identifier 114. The transfer database 110 further comprises a third entry 112C that comprises a third person identifier 114 identifying a person as a sender in a peer-to-peer transfer, a face image 116 of the person identified by the third person identifier 114, a resource identifier 118 indicating an amount of five dollars, a verification signal 120 identifying a voice command or signal that will be provided by the person identified by the third person identifier 114, and account information 122 for the person identified by the third person identifier 114. In other examples, the transfer database 110 may comprise any number of entries 112 and/or identify any other suitable types of resources and verification signals.

The network 108 comprises a plurality of network nodes configured to communicate data between the augmented reality user device 300 and one or more institutions. Examples of network nodes include, but are not limited to, routers, switches, modems, web clients, and web servers. The network 108 is configured to communicate data (e.g. transfer tokens 124 and confirmation messages 148) between the augmented reality user device 300 and one or more institutions (e.g. institution 106 and institution 126). Network 108 is any suitable type of wireless and/or wired network including, but not limited to, all or a portion of the Internet, the public switched telephone network, a cellular network, and a satellite network. The network 108 is configured to support any suitable communication protocols as would be appreciated by one of ordinary skill in the art upon viewing this disclosure.

Examples of institutions include, but are not limited to, organizations, businesses, government agencies, financial institutions, and universities. The institution 106 comprises a network device 107 comprising one or more processors 128 operably coupled to a memory 130. The one or more processors 128 are implemented as one or more central processing unit (CPU) chips, logic units, cores (e.g. a multi-core processor), field-programmable gate array (FPGAs), application specific integrated circuits (ASICs), or digital signal processors (DSPs). The one or more processors 128 are communicatively coupled to and in signal communication with the memory 130. The one or more processors 128 are configured to process data and may be implemented in hardware or software. The one or more processors 128 are configured to implement various instructions. For example, the one or more processors 128 are configured to implement a network transfer engine 132. In an embodiment, the network transfer engine 132 is implemented using logic units, FPGAs, ASICs, DSPs, or any other suitable hardware.

Examples of an augmented reality digital data transfer using the network transfer engine 132 are described in detail below and in FIG. 5. The network transfer engine 132 is configured to receive a transfer token 124 and to identify the first person 102, an account linked with the first person 102 and the institution 106, the second person 104, and an account linked with the second person 104 based on information provided by the transfer token 124. In an embodiment, the network transfer engine 132 is configured to use a person identifier 114 for the first person 102 to look-up and identify account information for the first person 102 in an account information database 134.

The network transfer engine 132 is further configured to use a person identifier 114 for the second person 104 to identify the second person 104. The network transfer engine 132 is further configured to identify a relationship between the account linked with the first person 102 and the account linked with the second person 104. The network transfer engine 132 is further configured to determine whether to perform a peer-to-peer transfer between the first person 102 and the second person 104 as an internal transfer, an in-network transfer, or an out-of-network transfer based on the relationship. For example, the network transfer engine 132 uses the account information 122 for second person 104 to look-up and identify a service network for the institution 126 of the second user 104 in a network information database 136. The network transfer engine 132 is configured to determine the relationship between the institution 106 of the first person 102 and the institution 126 of the second person 104 based on the service network memberships of the institutions. The network transfer engine 132 determines to perform an out-of-network transfer when the institutions are not members of the same service network. An out-of-network transfer is a transfer between accounts using network resources and/or network services from two different service networks. The network transfer engine 132 determines to perform an in-network transfer when the institutions are members of the same service network and are not the same institution. An in-network transfer is a transfer between accounts using shared network resources and/or network services such as real-time transfers. The network transfer engine 132 determines to perform an internal transfer when the institutions are the same institution. An internal transfer is a transfer between accounts within the same institution.

The network transfer engine 132 is configured to communicate one or more transfer messages 146 with the institution 126 for the second person 104 based on the determined type of transfer (i.e. an internal transfer, an in-network transfer, or an out-of-network transfer). Transfer messages 146 are any suitable signaling messages for executing a transfer between the institution 106 of the first person 102 and the institution 126 of the second person 104. Exchanging the one or more transfer messages 146 executes the transfer of a resource identified by the resource identifier 118 of the transfer token 124 between the account linked with the first person 102 and the account linked with the second person 104.

The memory 130 comprises one or more disks, tape drives, or solid-state drives, and may be used as an over-flow data storage device, to store programs when such programs are selected for execution, and to store instructions and data that are read during program execution. The memory 130 may be volatile or non-volatile and may comprise read-only memory (ROM), random-access memory (RAM), ternary content-addressable memory (TCAM), dynamic random-access memory (DRAM), and static random-access memory (SRAM). The memory 130 is operable to store network transfer instructions 138, account information database 134, network information database 136, and/or any other data or instructions. The network transfer instruction 138 comprise any suitable set of instructions, logic, rules, or code operable to execute the network transfer engine 132. The account information database 134 comprises account information for members of the institution 106. Account information includes, but is not limited to, institution names, account names, account balances, and account types. The network information database 136 comprises information identifying institutions that are members of a service network and available network resources and/or network services. In an embodiment, the account information database 134 and/or the network information database 136 may be stored in a memory external of the network device 107. For example, the network device 107 may be operably coupled to a remote database storing the account information database 134 and/or the network information database 136.

The following is a non-limiting example of how the augmented reality system 100 may operate. In this example, the first person 102 is the augmented reality device user and the second person 104 is a friend of the augmented reality user device user. The user authenticates themselves before using the augmented reality user device 300 by providing credentials (e.g. a log-in and password) or a biometric signal 305. The augmented reality user device 300 authenticates the user based on the user's input and allows the user to read and write entries 112 in a transfer database 110 and to perform digital data transfers. The augmented reality user device 300 also is able to identify the user and/or a person identifier 114 for the user upon authenticating the user.

The user and the friend may have a situation where the friend wants to borrow money from the user and then repay the user at a later time. The user creates an entry 112 in the transfer database 110 of the augmented reality user device 300 for the friend to transfer the funds back to the user when they see each other again. The entry 112 includes information such as a picture of the friend's face, the friend's name, the amount to be borrowed, and account information for the friend. The entry 112 also identifies a verification signal or code that the friend will give to the user to authenticate themselves and to approve of the transfer of funds back to the user.

At a later time, the user encounters the friend while using the augmented reality user device 300. For example, the user and the friend may see each other while out running errands or attending an event. The augmented reality user device 300 automatically captures an image of the friend and reminds the user that there is a pending transfer with the friend. The augmented reality user device 300 performs facial recognition on the image of the friend to extract facial features of the friend that can be used to look-up entries 112 in the transfer database 110 based on the stored face image of the friend. The augmented reality user device 300 performs the look-up in the transfer database 110 to determine whether there is an entry 112 in the transfer database 110 for the friend. The augmented reality user device 300 notifies the user using an augmented reality display that an entry 112 has been identified. For example, the augmented reality user device 300 presents a reminder as a virtual object with information about the pending transfer overlaid with the friend standing in a real scene. The reminder uses any of the information from the entry 112 to quickly alert the user about the details of the pending transaction. The user then begins the process for making a peer-to-peer transfer with the friend by providing an initiate transfer command 315 to the augmented reality user device 300. The augmented reality user device 300 may receive the initiate transfer command 315 as a voice command, a gesture, an interaction with a button on the augmented reality user device 300, or in any other suitable form.

The friend can authenticate themselves and approve of the transfer of funds back to the user by providing an authentication signal 140 that matches the verification signal 120 in the entry 112 for the transfer. For example, the friend may use a wearable device (e.g. another augmented reality user device 300) or a mobile device 144 (e.g. a mobile phone or tablet) that send the authentication signal 140 to the user's augmented reality user device 300 as a wireless signal such as a Bluetooth signal, an RFID signal, or an NFC signal. As another example, the friend may use a mobile device 144 to present a code (e.g. a QR code or barcode) or image to the augmented reality user device 300 as the authentication signal 140. The augmented reality user device 300 detects the code or image and compares it to a code or image stored as the verification signal 120 in the entry 112. As another example, the friend provides a voice command to the augmented reality user device 300 as the authentication signal 140. For example, the friend may say their name and/or give consent verbally to performing the transfer. As another example, the friend performs a gesture that is captured by the augmented reality user device 300 as the authentication signal 140. For example, the friend may nod their head or gives a thumbs up as an indication of consent to perform the transfer.

The augmented reality user device 300 receives the authentication signal 140 from the friend and compares the authentication signal 140 to the verification signal 120 for the entry 112 for the friend. The augmented reality user device 300 can compare features (e.g. the data content and/or the type of signal) of an authentication signal 140 transmitted as a wireless signal with the features of the stored verification signal 120 to determine whether the authentication signal 140 substantially matches (e.g. is the same) the verification signal 120. Similarly, the augmented reality user device 300 can compare features of an authentication signal 140 presented as a code or image with the features of the stored verification signal 120 to determine whether the authentication signal 140 substantially matches (e.g. is the same) the verification signal 120. The augmented reality user device 300 can perform voice recognition to identify the voice of the friend and/or a voice command provided by the friend and to compare the voice command to the stored verification signal 120 to determine whether the voice command substantially matches (e.g. is the same) the verification signal 120. The augmented reality user device 300 can perform gesture recognition to identify a gesture performed by the friend and to compare the gesture to the stored verification signal 120 to determine whether the gesture substantially matches (e.g. is the same) the verification signal 120.

Once the augmented reality user device 300 has authenticated the friend, the augmented reality user device 300 can begin the digital data transfer process. The augmented reality user device 300 generates a transfer token 124 that comprises information from the entry 112 for the friend in the transfer database 110. For example, the augmented reality user device 300 generates a transfer token 124 that identifies the user, the friend, an account for the friend, and the amount of funds being transferred. The augmented reality user device 300 then sends the transfer token 124 to an institution 106 (e.g. a financial institution) for the user.

A network device 107 of the institution 106 for the user receives the transfer token 124. The network device 107 processes the transfer token 124 to identify the user. The network device 107 looks up account information for the user upon identifying the user. The network device 107 further processes the transfer token 124 to identify the friend and the account information for the friend. The network device 107 looks up an institution 126 and service network information for the friend based on the identified account information for the friend.

The network device 107 then determines the relationship between the user's account and institution 106 and the friend's account and institution 126. The network device 107 determines whether the institution 106 for the user and the institution 126 for the friend are members of different service networks, members of the same service network, or are the same institution (e.g. the same entity). The network device 107 performs an out-of-network transfer when the institution 106 for the user and the institution 126 for the friend are members of different service networks. The network device 107 performs an in-network transfer when the institution 106 for the user and the institution 126 for the friend are members of the same service network. The network device 107 performs an internal transfer when the institution 106 for the user and the institution 126 for the friend are the same entity. The network device 107 performs the out-of-network transfer, in-network transfer, and internal transfer by communicating transfer messages 146 between the institution 106 for the user and the institution 126 for the friend. The exchange of transfer messages 146 executes the transfer of a funds from the friend's account to the user's account.

The institution 126 for the friend sends a confirmation message 148 to the user via the augmented reality user device 300, a user device for the friend, and/or the network device 107 that indicates a transfer of funds has been completed. When the augmented reality user device 300 receives a confirmation message 148, the augmented reality user device 300 presents the confirmation message 148 to the user as a virtual object on the augmented reality display.

FIG. 2 is a first person view 200 of an embodiment from an augmented reality user device 300 display overlaying virtual objects 202 in conjunction with tangible objects 204 in a real scene 206. In FIG. 2, a person employing the augmented reality user device 300 is approached by a second person 104. The augmented reality user device 300 captures an image 332 of the second person 104 and performs facial recognition on the captured image 332 to determine whether there is a pending entry 112 in the transfer database 110 for the second person 104.

The augmented reality user device 300 uses an augmented reality display to notify the first person 102 that an entry 112 in the transfer database 110 has been identified for the second person 104. For example, the augmented reality user device 300 presents the notification as a virtual object 202. The virtual object 202 includes a person identifier 114, a face image 116, and a resource identifier 118 using information from the entry 112 for the second person 104. The virtual object 202 may comprise any other information or combination of information. The augmented reality user device 300 presents the virtual object 202 in real-time as an overlay onto one or more tangible objects 204 in a real scene 206 using an augmented reality display. Examples of tangible objects 204 include, but are not limited to, buildings, trees, landmarks, people, objects, or any other physical objects.

FIG. 3 is a schematic diagram of an embodiment of an augmented reality user device 300 employed by the augmented reality system 100. The augmented reality user device 300 may be configured to identify people around a user operating the augmented reality user device 300, to determine whether the identified people have an entry 112 in a transfer database 110 for a pending transaction with the user, and to facilitate a digital data transfer (e.g. a peer-to-peer transfer) with identified people that have a pending transaction with the user. An example of the augmented reality user device 300 in operation is described in FIG. 4.

The augmented reality user device 300 comprises a processor 302, a memory 304, a camera 306, a display 308, a wireless communication interface 310, a network interface 312, a microphone 314, a global position system (GPS) sensor 316, and one or more biometric devices 317. The augmented reality user device 300 may be configured as shown or in any other suitable configuration. For example, augmented reality user device 300 may comprise one or more additional components and/or one or more shown components may be omitted.

Examples of the camera 306 include, but are not limited to, charge-coupled device (CCD) cameras and complementary metal-oxide semiconductor (CMOS) cameras. The camera 306 is configured to capture images 332 of people, text, and objects within a real environment. The camera 306 may be configured to capture images 332 continuously, at predetermined intervals, or on-demand. For example, the camera 306 may be configured to receive a command from a user to capture an image 332. In another example, the camera 306 is configured to continuously capture images 332 to form a video stream of images 332. The camera 306 may be operably coupled to a facial recognition engine 322 and/or a object recognition engine 324 and provides images 332 to the facial recognition engine 322 and/or the object recognition engine 324 for processing, for example, to identify people, text, and/or objects in front of the user.

The display 308 is configured to present visual information to a user in an augmented reality environment that overlays virtual or graphical objects onto tangible objects in a real scene in real-time. In an embodiment, the display 308 is a wearable optical head-mounted display configured to reflect projected images and allows a user to see through the display. For example, the display 308 may comprise display units, lens, semi-transparent mirrors embedded in an eye glass structure, a contact lens structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matric OLED (AMOLED), an organic LED (OLED) display, a projector display, or any other suitable type of display as would be appreciated by one of ordinary skill in the art upon viewing this disclosure. In another embodiment, the display 308 is a graphical display on a user device. For example, the graphical display may be the display of a tablet or smart phone configured to display an augmented reality environment with virtual or graphical objects overlaid onto tangible objects in a real scene in real-time.

Examples of the wireless communication interface 310 include, but are not limited to, a Bluetooth interface, an RFID interface, an NFC interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. The wireless communication interface 310 is configured to allow the processor 302 to communicate with other devices. For example, the wireless communication interface 310 is configured to allow the processor 302 to send and receive signals with other devices for the user (e.g. a mobile phone) and/or with devices for other people. The wireless communication interface 310 is configured to employ any suitable communication protocol.

The network interface 312 is configured to enable wired and/or wireless communications and to communicate data through a network, system, and/or domain. For example, the network interface 312 is configured for communication with a modem, a switch, a router, a bridge, a server, or a client. The processor 302 is configured to receive data using network interface 312 from a network or a remote source.

Microphone 314 is configured to capture audio signals (e.g. voice signals or commands) from a user and/or other people near the user. The microphone 314 is configured to capture audio signals continuously, at predetermined intervals, or on-demand. The microphone 314 is operably coupled to the voice recognition engine 320 and provides captured audio signals to the voice recognition engine 320 for processing, for example, to identify a voice command from the user.

The GPS sensor 316 is configured to capture and to provide geographical location information. For example, the GPS sensor 316 is configured to provide the geographic location of a user employing the augmented reality user device 300. The GPS sensor 316 is configured to provide the geographic location information as a relative geographic location or an absolute geographic location. The GPS sensor 316 provides the geographic location information using geographic coordinates (i.e. longitude and latitude) or any other suitable coordinate system.

Examples of biometric devices 317 include, but are not limited to, retina scanners and finger print scanners. Biometric devices 317 are configured to capture information about a person's physical characteristics and to output a biometric signal 305 based on captured information. A biometric signal 305 is a signal that is uniquely linked to a person based on their physical characteristics. For example, a biometric device 317 may be configured to perform a retinal scan of the user's eye and to generate a biometric signal 305 for the user based on the retinal scan. As another example, a biometric device 317 is configured to perform a fingerprint scan of the user's finger and to generate a biometric signal 305 for the user based on the fingerprint scan. The biometric signal 305 is used by a biometric engine 330 to identify and/or authenticate a person.

The processor 302 is implemented as one or more CPU chips, logic units, cores (e.g. a multi-core processor), FPGAs, ASICs, or DSPs. The processor 302 is communicatively coupled to and in signal communication with the memory 304, the camera 306, the display 308, the wireless communication interface 310, the network interface 312, the microphone 314, the GPS sensor 316, and the biometric devices 317. The processor 302 is configured to receive and transmit electrical signals among one or more of the memory 304, the camera 306, the display 308, the wireless communication interface 310, the network interface 312, the microphone 314, the GPS sensor 316, and the biometric devices 317. The electrical signals are used to send and receive data (e.g. images 232 and transfer tokens 124) and/or to control or communicate with other devices. For example, the processor 302 transmits electrical signals to operate the camera 306. The processor 302 may be operably coupled to one or more other devices (not shown).

The processor 302 is configured to process data and may be implemented in hardware or software. The processor 302 is configured to implement various instructions. For example, the processor 302 is configured to implement a virtual overlay engine 318, a voice recognition engine 320, a facial recognition engine 322, an object recognition engine 324, a gesture recognition engine 326, a digital data transfer engine 328, and a biometric engine 330. In an embodiment, the virtual overlay engine 318, the voice recognition engine 320, the facial recognition engine 322, the object recognition engine 324, the gesture recognition engine 326, the digital data transfer engine 328, and the biometric engine 330 are implemented using logic units, FPGAs, ASICs, DSPs, or any other suitable hardware.

The virtual overlay engine 318 is configured to overlay virtual objects onto tangible objects in a real scene using the display 308. For example, the display 308 may be a head-mounted display that allows a user to simultaneously view tangible objects in a real scene and virtual objects. The virtual overlay engine 318 is configured to process data to be presented to a user as an augmented reality virtual object on the display 308. An example of overlay virtual objects onto tangible objects in a real scene is shown in FIG. 2.

The voice recognition engine 320 is configured to capture and/or identify voice patterns using the microphone 314. For example, the voice recognition engine 320 is configured to capture a voice signal from a person and to compare the captured voice signal to known voice patterns or commands to identify the person and/or commands provided by the person. For instance, the voice recognition engine 320 is configured to receive a voice signal to authenticate a user and/or another person or to initiate a digital data transfer.

The facial recognition engine 322 is configured to identify people or faces of people using images 332 or video streams created from a series of images 332. In one embodiment, the facial recognition engine 322 is configured to perform facial recognition on an image 332 captured by the camera 306 to identify the faces of one or more people in the captured image 332. In another embodiment, the facial recognition engine 322 is configured to perform facial recognition in about real-time on a video stream captured by the camera 306. For example, the facial recognition engine 322 is configured to continuously perform facial recognition on people in a real scene when the camera 306 is configured to continuous capture images 332 from the real scene. The facial recognition engine 322 employs any suitable technique for implementing facial recognition as would be appreciated by one of ordinary skill in the art upon viewing this disclosure.

The object recognition engine 324 is configured to identify objects, object features, text, and/or logos using images 332 or video streams created from a series of images 332. In one embodiment, the object recognition engine 324 is configured to identify objects and/or text within an image 332 captured by the camera 306. In another embodiment, the object recognition engine 324 is configured to identify objects and/or text in about real-time on a video stream captured by the camera 306 when the camera 306 is configured to continuously capture images 332. The object recognition engine 324 employs any suitable technique for implementing object and/or text recognition as would be appreciated by one of ordinary skill in the art upon viewing this disclosure.

The gesture recognition engine 326 is configured to identify gestures performed by a user and/or other people. Examples of gestures include, but are not limited to, hand movements, hand positions, finger movements, head movements, and/or any other actions that provide a visual signal from a person. For example, gesture recognition engine 326 is configured to identify hand gestures provided by a user to indicate various commands such as a command to initiate a peer-to-peer transfer. As another example, the gesture recognition engine 326 is configured to identify hand gestures provided by a person standing in front of the user to indicate various commands or signals such as an authentication signal. The gesture recognition engine 326 employs any suitable technique for implementing gesture recognition as would be appreciated by one of ordinary skill in the art upon viewing this disclosure.

The digital data transfer engine 328 is configured to identify a person that is in front of a user and to facilitate a digital transfer (e.g. a peer-to-peer transfer) with the identified person. For example, when a user approaches another person the digital data transfer engine 328 is configured to determine whether an entry 112 exists for the person in the transfer database 110. The digital data transfer engine 328 is further configured to receive an initiate transfer command 315 from the user to initiate a transfer with identified person. The user provides the initiate transfer command 315 to indicate that the user would like to transfer the resource identified by the entry 112. The user may provide the initiate transfer command 315 by giving a voice command, performing a gesture, interacting with a physical component (e.g. a button, knob, or slider) of the augmented reality user device 200, or any other suitable mechanism as would be appreciated by one of ordinary skill in the art.

The digital data transfer engine 328 is further configured to receive an authentication signal 140 from the identified person to authenticate the identified person. The digital data transfer engine 328 may receive the authentication signal 140 as a wireless signal, a voice signal, a gesture performed by the identified person, an image on a user device, or in any other suitable form. The identified person provides the authentication signal 140 to the digital data transfer engine 328 to authenticate themselves and to indicate that they approve of the user's request to initiate a digital data transfer. The digital data transfer engine 328 is further configured to generate a transfer token with information for executing the digital data transfer and to send the transfer token to an institution associated with the user to initiate the digital data transfer. An example of employing the digital data transfer engine 328 to facilitate a digital data transfer is described in FIG. 4.

The biometric engine 330 is configured to identify a person based on a biometric signal 305 generated from the person's physical characteristics. The biometric engine 330 employs one or more biometric devices 317 to identify a user based on one or more biometric signals 305. For example, the biometric engine 330 receives a biometric signal 305 from the biometric device 317 in response to a retinal scan of the user's eye and/or a fingerprint scan of the user's finger. The biometric engine 330 compares biometric signals 305 from the biometric device 317 to previously stored biometric signals 305 for the user to authenticate the user. The biometric engine 330 authenticates the user when the biometric signals 305 from the biometric devices 317 substantially matches (e.g. is the same as) the previously stored biometric signals 305 for the user.

The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise ROM, RAM, TCAM, DRAM, and SRAM. The memory 304 is operable to store a transfer database 110, images 332, transfer tokens 124, biometric signals 305, virtual overlay instructions 336, voice recognition instructions 338, facial recognition instructions 340, object recognition instructions 342, gesture recognition instructions 344, digital data transfer instructions 346, biometric instructions 347, and any other data or instructions.

The transfer database 110 comprises a plurality of entries 112 identifying pending transfers and may be configured similarly to the transfer database 110 described in FIG. 1.

Images 332 comprises images captured by the camera 306 and images from other sources. For example, the images 332 may comprise stored face images 116 of other people that are used when performing facial recognition. The face images 116 may be captured using camera 306 or may be downloaded from another source such as a flash memory device or a remote server via an Internet connection. An example of the augmented reality user device 300 employing the transfer database 110 to identify an entry 112 for another person is described in FIG. 4.

Biometric signals 305 are signals or data that is generated by a biometric device 317 based on a person's physical characteristics. Biometric signal 305 are used by the augmented reality user device 300 to identify and/or authenticate an augmented reality user device 300 user by comparing biometric signals 305 captured by the biometric devices 317 with previously stored biometric signals 305.

Transfer tokens 124 are generated by the digital data transfer engine 328 and sent to an institution to initiate a digital data transfer between the user and another person. The transfer tokens 124 may comprise any suitable information for executing a digital data transfer. In one embodiment, a transfer token 124 is a message or data request comprising information identifying a user, an account for the user, a person identified for a peer-to-peer transfer, an account for the identified person, a resource to be transferred between the user and the identified person, an amount of the resource to be transferred between the user and the identified person, and/or any other suitable information. An example of the augmented reality user device 300 generating and using a transfer token 124 to perform a digital data transfer is described in FIG. 4.

The virtual overlay instructions 336, the voice recognition instructions 338, the facial recognition instructions 340, the object recognition instructions 342, the gesture recognition instructions 344, the digital data transfer instructions 346, and the biometric instructions 347 each comprise any suitable set of instructions, logic, rules, or code operable to execute virtual overlay engine 318, the voice recognition engine 320, the facial recognition engine 322, the object recognition engine 324, the gesture recognition engine 326, the digital data transfer engine 328, and the biometric engine 330, respectively.

FIG. 4 is a flowchart of an embodiment of an augmented reality digital data transfer method 400 performed by an augmented reality user device 300. Method 400 is employed by the augmented reality user device 300 to identify a pending transfer with another person and to generate a transfer token 124 to facilitate a peer-to-peer transfer with the identified person. The augmented user device 300 is configured with a plurality of entries 112 in the transfer database 110 for pending transactions with various people.

At step 402, the augmented reality user device 300 receives an activation command from a first person (i.e. the augmented reality user device 300 user) to configure the augmented reality user device 300 for performing digital data transfers. The user provides the activation command to the augmented reality user device 300 by using a keypad, a button, a switch, a graphical user interface, a voice command, a gesture, a biometric signal 305, or any other suitable mechanism. The activation command is also used to authenticate the user. For example, the processor 302 authenticates the user based on credentials (e.g. a log-in and/or password) and/or a biometric signal 305 provided by the user. Upon authenticating the user, the augmented reality user device 300 allows the user to read and write entries 112 in the transfer database 110 and to perform digital data transfers. The augmented reality user device 300 also identifies the user and/or identifier a person identifier 114 for the user upon authenticating the user.

Once activated, the augmented reality user device 300 allows the user to perform normal daily activities while continuously trying to identify people the user interacts with or sees. At step 404, the augmented reality user device 300 captures an image 332 of a second person. The second person may be a friend, relative, or any other person the user sees or would like to make a digital data transfer with. In one embodiment, the augmented reality user device 300 triggers the camera 306 to capture the image 332 of the other person. In another embodiment, the camera 306 automatically captures the image 332 of the other person. The camera 306 captures one or more images 332 of the other person that includes at the other person's face.

At step 406, the augmented reality user device 300 performs facial recognition on the captured image 332 to identify the face of the other person. For example, the augmented reality user device 300 performs image processing on the captured image 332 to identify the face and face features of the other person.

At step 408, the augmented reality user device 300 compares the face or face features of the second person to face images 116 in a transfer database 110 to identify an entry 112 for the second person. The augmented reality user device 300 may use the face or face features of the second person as a reference to look-up entries 112 based on the face images 116 in the transfer database 110.

At step 410, the augmented reality user device 300 determines whether there is an entry 112 for the second person in the transfer database 110. The augmented reality user device 300 determines that there is an entry 112 for the second person when the augmented reality user device 300 finds an entry 112 with a face image 116 that substantially matches or is the same as the face of the second person. The augmented reality user device 300 proceeds to step 412 when the augmented reality user device 300 identifies the entry 112 for the second person.

The augmented reality user device 300 determines that there is not an entry 112 for the second person when the augmented reality user device 300 is unable to find an entry 112 with a face image 116 that substantially matches the face of the second person. The augmented reality user device 300 returns to step 404 when the augmented reality user device 300 is unable to identify an entry 112 for the second person. In one embodiment, the augmented reality user device 300 retries locating an entry 112 in the transfer database 110 for the second person by capturing and processing another image 332 of the second person. In another embodiment, the augmented reality user device 300 waits for additional instructions from the first person.

At step 412, the augmented reality user device 300 indicates that an entry 112 for the second person has been identified. The augmented reality user device 300 uses the augmented reality display 308 to notify the first person that an entry 112 in the transfer database 110 has been identified for the second person. For example, the augmented reality user device 300 presents the notification as one or more virtual objects overlaid in a real scene using the augmented reality display 308.

The user may review the notification and determine whether they want to perform a digital data transfer with the second person based on the information provided by the notification. The user indicates they would like to perform the digital data transfer with the second person by providing an initiate transfer command 315. At step 414, the augmented reality user device 300 receives an initiate transfer command 315 from the first person indicating to initiate a peer-to-peer transfer with the second person. The first person may provide the initiate transfer command 315 using a keypad, a button, a switch, a graphical user interface, a voice command, a gesture, or any other suitable mechanism. For example, the augmented reality user device 300 performs gesture recognition to identify a gesture performed by the first person indicating an initiate transfer command 315. As another example, the augmented reality user device 300 performs voice recognition to identify a voice command or voice pattern performed by the first person indicating an initiate transfer command 315.

Once the user initiates the peer-to-peer transfer, the second user authenticates themselves and/or approves of the transfer by providing an authentication signal 140 that matches the verification signal 120 in the entry 112 for the transfer. In one embodiment, the second user may use a wearable device (e.g. another augmented reality user device 300) or a mobile device 144 (e.g. a mobile phone or tablet) that send the authentication signal 140 to the augmented reality user device 300 as a wireless signal such as a Bluetooth signal, an RFID signal, or an NFC signal. In another embodiment, the second user may use a mobile device 144 to present a code (e.g. a QR code or barcode) or image to the augmented reality user device 300 as the authentication signal 140. In another embodiment, the second user provides a voice command to the augmented reality user device 300 as the authentication signal 140. For example, the friend may say their name and/or give consent verbally to performing the transfer. In another embodiment, the second user performs a gesture that is captured by the augmented reality user device 300 as the authentication signal 140. For example, the friend may nod their head or gives a thumbs up as an indication of consent to perform the transfer.

At step 416, the augmented reality user device 300 receives an authentication signal 140 identifying the second person. The augmented reality user device 300 may receive the authentication signal 140 as a wireless signal, a code, an image, a voice command, a gesture, and/or any other type of signal, or combination thereof.

At step 418, the augmented reality user device 300 compares the authentication signal 140 with a verification signal 120 for the entry 112 for the second person to authenticate the identify of the second person. The augmented reality user device 300 may compare the features and/or the content of the authentication signal 140 and the verification signal 120 to determine whether the authentication signal 140 is the same as the verification signal 120. For example, the augmented reality user device 300 compares features (e.g. the data content and/or the type of signal) of an authentication signal 140 transmitted as a wireless signal with the features of the stored verification signal 120 to determine whether the authentication signal 140 substantially matches (e.g. is the same) the verification signal 120. The augmented reality user device 300 compares features of an authentication signal 140 presented as a code or image with the features of the stored verification signal 120 to determine whether the authentication signal 140 substantially matches (e.g. is the same) the verification signal 120. The augmented reality user device 300 performs voice recognition to identify the voice of the second person and/or a voice command provided by the second person and to compare the voice command to the stored verification signal 120 to determine whether the voice command substantially matches (e.g. is the same) the verification signal 120. The augmented reality user device 300 can perform gesture recognition to identify a gesture performed by the second person and to compare the gesture to the stored verification signal 120 to determine whether the gesture substantially matches (e.g. is the same) the verification signal 120.

At step 420, the augmented reality user device 300 determines whether the authentication signal 140 matches (e.g. is the same) the verification signal 120. The augmented reality user device 300 proceeds to step 422 when the authentication signal 140 matches the verification signal 120. Otherwise, the augmented reality user device 300 proceeds to step 424 when the authentication signal 140 is different than the verification signal 120.

Once the augmented reality user device 300 authenticates the second person, the augmented reality user device 300 begins the digital data transfer by generating a transfer token 124 for the peer-to-peer transfer between the user and the second person. At step 422, the augmented reality user device 300 generates a transfer token 124 that comprises information from the entry 112 for the second user in the transfer database 110. The transfer tokens 124 may comprise any suitable information for executing a digital data transfer. The transfer tokens 124 may comprise information identifying a user, an account for the user, a person identified for a peer-to-peer transfer, an account for the identified person, a resource to be transferred between the user and the identified person, an amount of the resource to be transferred between the user and the identified person, and/or any other suitable information. For instance, the transfer token 124 may comprise a person identifier 114 for the first person, a person identifier 114 for the second person, a resource identifier 118, and account information 122 for the second person. At step 426, the augmented reality user device 300 sends the transfer token 124 to a first institution associated with the first person to initiate the peer-to-peer transfer. Sending the transfer token 124 to the first institution triggers the first institution to initiate the digital data transfer between the user and the second person.

Returning to step 420, the augmented reality user device 300 proceeds to step 424 when the authentication signal 140 is different than the verification signal 120. At step 424, the augmented reality user device 300 indicates that an error has occurred. In one embodiment, the augmented reality user device 300 prompts the first person to request for the second person resend the authentication signal 140 and returns to step 416. For example, the augmented reality user device 300 prompts the first person using one or more virtual objects in a real scene using an augmented reality display 308. In some embodiments, step 424 may be optional and omitted.

FIG. 5 is a flowchart of an embodiment of an augmented reality digital data transfer method 500 performed by network device 107. Method 500 may be employed by a network device 107 to execute a peer-to-peer transfer between an augmented reality user device 300 user and another person. For example, method 500 uses a transfer token 124 to identify account information for the augmented reality user device 300 user and the other person to communicate information for facilitating the peer-to-peer transfer. Method 500 then executes the peer-to-peer transfer using an out-of-network transfer, an in-network transfer, or an internal transfer based on the determined relationship between the institutions of the first person and the second person.

At step 502, the network device 107 receives a transfer token 124 from an augmented reality user device 300. The transfer token 124 may be generated and configured similar to the transfer token 124 described in step 422 in FIG. 4.

At step 504, the network device 107 identifies a first person based on the transfer token 124. For example, first person is the augmented reality user device 300 user and the network device 107 identify the user based on a person identifier 114 from transfer token 124.

At step 506, the network device 107 identifies a first account linked with the first person. For example, the network device 107 uses the person identifier 114 for the user to look-up and identify account information for the user in an account information database 134. The network device 107 may use the person identifier 114 as a look-up reference to query the account information database 134.

At step 508, the network device 107 identifies a second person and a second account linked with the second person based on the transfer token 124. The second person is another person that the augmented reality user device 300 user would like perform a digital data transfer with. The network device 107 uses a person identifier 114 provided by the transfer token 124 for the second person to identify the second person. The network device 107 also uses the account information 122 provided by the transfer token 124 to identify an account for the second person.

At step 510, the network device 107 identifies a second institution for the second user based on the second account. The network device 107 may use the person identifier 114 and/or the account information 122 to query the account information database 134. The network device 107 may also use the person identifier 114 and/or the account information 122 for second person to look-up and identify a service network for the institution of the second user in a network information database 136.

At step 512, the network device 107 determines whether the first person and the second person are members of the same service network based on the identify of the first institution and the second institution. The network device 107 determines the relationship between the institution of the first person and the institution of the second person based on the service network memberships of each institution as indicated by the network information database 136. The network device 107 proceeds to step 514 when the network device 107 determines that the first person and the second person are members of the same service network. Otherwise, the network device 107 proceeds to step 516 when the network device 107 determines that the first person and the second person are not members of the same service network.

At step 514, the network device 107 determines whether the first institution is the same as the second institution. In other words, the network device 107 determines whether the first institution and the second institution are the entity, for example, the same business. The network device 107 proceeds to step 518 when the network device 107 determines that first institution is the same as the second institution. Otherwise, the network device 107 proceeds to step 520 when network device 107 determines that the first institution is different than the second institution.

At step 518, the network device 107 facilitates an internal transfer between the first person and the second person. The network device 107 communicates one or more transfer messages 146 with the institution for the first person and the second person indicating to transfer a resource identified by the resource identifier 118 of the transfer token 124 between the account linked with the first person and the account linked with the second person within the institution.

At step 520, the network device 107 facilitates an in-network transfer between the first person and the second person. The network device 107 communicates one or more transfer messages 146 with the institution for the second person indicating to transfer a resource identified by the resource identifier 118 of the transfer token 124 between the account linked with the first person and the account linked with the second person within the institution using one or more network services such as a real-time transfer.

Returning to step 512, the network device 107 proceeds to step 516 when the network device 107 determines that the first person and the second person are not members of the same service network. At step 516, the network device 107 facilitates an out-of-network transfer between the first person and the second person. The network device 107 communicates one or more transfer messages 146 with the institution for the second person indicating transfer a resource identified by the resource identifier 118 of the transfer token 124 between the account linked with the first person and the account linked with the second person within the institution.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An augmented reality system comprising:
an augmented reality user device for a first person comprising:
  a head-mounted display configured to overlay virtual objects onto tangible objects in real-time;
  a memory operable to store a transfer database comprising a plurality of entries each comprising:
    a person identifier identifying a second person;
    a face image of the second person linked with the person identifier;
    account information for the second person;
    a resource identifier identifying a resource to be transferred; and
    a verification signal identifying a signal provided by the second person to authenticate the second person;
  a camera configured to capture an image of the second person; and
  one or more processors operably coupled to the head-mounted display, the memory, and the camera, and configured to implement:
    a facial recognition engine configured to perform facial recognition on the captured image to identify a face of the second person; and
    a digital data transfer engine configured to:
      compare the face of the second person to face images in the transfer database to identify an entry for the second person;
      receive an initiate transfer command from the first person indicating to initiate a peer-to-peer transfer when the entry for the second person has been identified;
      receive an authentication signal identifying the second person;
      compare the authentication signal with the verification signal for the entry for the second person to authenticate the identify of the second person;
      generate a transfer token for facilitating the peer-to-peer transfer when the authentication signal is the same as the verification signal, wherein the transfer token identifies the first person, the second person, an account for the second person, and a resource to be transferred; and
      send the transfer token to a first institution associated with the first person to initiate the peer-to-peer transfer; and
a network device for the first institution comprising a network transfer engine configured to:
  receive the transfer token;
  identify the first person and a first account linked with the first person based on the transfer token;
  identify the second person and a second account linked with the second person based on the transfer token;
  identify a second institution for the second person based on the second account linked with the second person;
  determine whether the first person and the second person are members of the same service network based on the identity of the first institution and the identity of the second institution;
  facilitate an out-of-network transfer between the first account and the second account when the first person and the second person are not members of the same service network; and
  facilitate an in-network transfer between the first account and the second account when the first person and the second person are members of the same service network.

2. The system of claim 1, wherein facilitating the in-network transfer comprises:
determining whether the first institution is the same as the second institution; and
facilitating an internal transfer between the first account and the second account within the same institution when the first institution is the same as the second institution.

3. The system of claim 1, wherein the authentication signal from the second person is a voice command provided by the second person.

4. The system of claim 1, wherein the authentication signal from the second person is a wireless signal provided by the second person via a user device.

5. The system of claim 1, wherein the authentication signal from the second person is a gesture provided by the second person.

6. The system of claim 1, wherein the one or more processors are configured to implement a virtual overlay engine configured to overlay a virtual object indicating the entry for the second person has been identified with a real scene in real-time.

7. The system of claim 1, wherein the one or more processors are configured to implement a virtual overlay engine configured to overlay at least a portion of the entry for the second person with a real scene in real-time.

8. The system of claim 1, wherein:
the initiate transfer command is a gesture performed by the first person; and
receiving the initiate transfer command from the first person to initiate the peer-to-peer transfer comprises performing gesture recognition using the camera to identify the gesture performed by the first person.

9. The system of claim 1, wherein:
the augmented reality user device comprises a microphone;
the initiate transfer command is a voice command performed by the first person; and
receiving the initiate transfer command from the first person to initiate the peer-to-peer transfer comprises performing voice recognition using the microphone to identify the voice command performed by the first person.

10. An augmented reality digital data transfer method comprising:
capturing, using a camera on an augmented reality user device of a first person, an image of a second person;
performing, by a facial recognition engine, facial recognition on the captured image to identify a face of the second person;
comparing, by a digital data transfer engine, the face of the second person to face images in a transfer database to identify an entry for the second person, wherein the entry comprises:
a person identifier identifying the second person,
a face image of the second person,
account information for the second person,
a resource identifier identifying a resource to be transferred, and
a verification signal identifying a signal provided by the second person to authenticate the second person;
receiving, by the digital data transfer engine, an initiate transfer command from the first person indicating to initiate a peer-to-peer transfer when the entry for the second person has been identified;
receiving, by the digital data transfer engine, an authentication signal identifying the second person;
comparing, by the digital data transfer engine, the authentication signal to the verification signal for the entry of the second person to authenticate the identify of the second person;
generating, by the digital data transfer engine, a transfer token for facilitating the peer-to-peer transfer when the authentication signal is the same as the verification signal, wherein the transfer token identifies the first person, the second person, an account for the second person, and a resource to be transferred;
sending, by the digital data transfer engine, the transfer token to a first institution associated with the first person to initiate the peer-to-peer transfer;

identifying, by a network transfer engine for the first institution, the first person and a first account linked with the first person based on the transfer token;
identifying, by the network transfer engine, the second person and a second account linked with the second person based on the transfer token;
identifying, by the network transfer engine, a second institution for the second person based on the second account linked with the second person;
determining, by the network transfer engine, whether the first person and the second person are members of the same service network based on the identity of the first institution and the identity of the second institution;
facilitating, by the network transfer engine, an out-of-network transfer between the first account and the second account when the first person and the second person are not members of the same service network; and
facilitating, by the network transfer engine, an in-network transfer between the first account and the second account when the first person and the second person are members of the same service network.

11. The method of claim 10, wherein facilitating the in-network transfer comprises:
determining, by the network transfer engine, whether the first institution is the same as the second institution; and
facilitating, by the network transfer engine, an internal transfer between the first account and the second account within the same institution when the first institution is the same as the second institution.

12. The method of claim 10, wherein receiving the authentication signal from the second person comprises receiving a voice command provided by the second person.

13. The method of claim 10, wherein receiving the authentication signal from the second person comprises receiving a wireless signal provided by the second person via a user device.

14. The method of claim 10, wherein receiving the authentication signal from the second person comprises receiving a gesture provided by the second person.

15. The method of claim 10, further comprising overlaying, by a virtual overlay engine, a virtual object indicating the entry for the second person has been identified with a real scene in real-time.

16. The method of claim 10, further comprising overlaying, by a virtual overlay engine, at least a portion of the entry for the second person with a real scene in real-time.

17. An augmented reality user device comprising:
a head-mounted display configured to overlay virtual objects onto tangible objects in real-time for a first person;
a memory operable to store a transfer database comprising a plurality of entries each comprising:
a person identifier identifying a second person,
a face image of the second person linked with the person identifier,
account information for the second person,
a resource identifier identifying a resource to be transferred, and
a verification signal identifying a signal provided by the second person to authenticate the second person;
a camera configured to capture an image of the second person; and
one or more processors operably coupled to the head-mounted display, the memory, and the camera, and configured to implement:

a facial recognition engine configured to perform facial recognition on the captured image to identify a face of the second person; and a digital data transfer engine configured to:
  compare the face of the second person to face images in the transfer database to identify an entry for the second person;
  receive an initiate transfer command from the first person indicating to initiate a peer-to-peer transfer when the entry for the second person has been identified;
  receive an authentication signal identifying the second person;
  compare the authentication signal with the verification signal for the entry for the second person to authenticate the identify of the second person;
  generate a transfer token for facilitating the peer-to-peer transfer when the authentication signal is the same as the verification signal, wherein the transfer token identifies:
    the first person,
    the second person,
    an account for the second person,
    and a resource to be transferred; and
  send the transfer token to a first institution associated with the first person to initiate the peer-to-peer transfer.

18. The apparatus of claim 17, wherein the one or more processors are configured to implement a virtual overlay engine configured to overlay a virtual object indicating the entry for the second person has been identified with a real scene in real-time.

19. The apparatus of claim 17, wherein the one or more processors are configured to implement a virtual overlay engine configured to overlay at least a portion of the entry for the second person with a real scene in real-time.

20. The apparatus of claim 17, wherein receiving the authentication signal from the second person comprises receiving a gesture provided by the second person.

* * * * *